(12) United States Patent
Weik et al.

(10) Patent No.: US 7,372,950 B2
(45) Date of Patent: May 13, 2008

(54) METHOD FOR SUPPORTING THE COMMUNICATION OF INFORMATION VIA A COMMUNICATIONS SYSTEM

(75) Inventors: Hartmut Weik, Stuttgart (DE); Lothar Krank, Ditzingen (DE); Wolfgang Lautenschlager, Weissach (DE); Uwe Stahl, Leonberg (DE)

(73) Assignee: ALCATEL, Paris (FR)

( * ) Notice: Subject to any disclaimer, the term of this patent is extended or adjusted under 35 U.S.C. 154(b) by 1376 days.

(21) Appl. No.: 10/098,508

(22) Filed: Mar. 18, 2002

(65) Prior Publication Data

US 2002/0143678 A1 Oct. 3, 2002

(30) Foreign Application Priority Data

Mar. 27, 2001 (DE) ................................ 101 15 031

(51) Int. Cl.
*H04M 3/42* (2006.01)
(52) U.S. Cl. ............ 379/203.01; 379/111; 379/214.01; 379/218.02; 379/265.01; 705/35
(58) Field of Classification Search ................ 379/111, 379/203.01, 214.01, 218.02, 265.01; 705/35
See application file for complete search history.

(56) References Cited

U.S. PATENT DOCUMENTS 4,879,742 A * 11/1989 Taniguchi et al. .......... 379/111
5,400,395 A * 3/1995 Berenato ................ 379/114.02
6,658,102 B1 * 12/2003 Van Amerongen ..... 379/201.02

FOREIGN PATENT DOCUMENTS

| DE | 197 50 290 A1 | 5/1999 |
| EP | 0 751 662 A3 | 1/1997 |
| WO | WO 94/28683 A1 | 12/1994 |
| WO | WO 97/05749 A2 | 2/1997 |

* cited by examiner

*Primary Examiner*—Quynh H. Nguyen
(74) *Attorney, Agent, or Firm*—Sughrue Mion, PLLC (57) ABSTRACT

The invention concerns a method for supporting the communication of information via a communications system, as well as a service unit, an electronic agent, software products and servers for supporting the communication of information via a communications system which comprises communications networks of two or more network operators. The service unit passes a request for the communication of information to two or more electronic agents which interact with the service unit within the framework of a virtual electronic marketplace for information communication. The service unit prompts the electronic agents, once or several times, through interaction within the framework of the electronic marketplace for information, to submit offers for the execution of the requested communication of information. An offer submitted by one of the electronic agents in response to such a prompt, through interaction within the framework of the electronic marketplace for information, is confirmed to this electronic agent by the service unit, and the service unit initiates the communication of the information via the communications network of the assigned network operator. The electronic agent communicates to a network management unit of the assigned network operator negotiated conditions for the transmission of the information.

18 Claims, 4 Drawing Sheets

METHOD FOR SUPPORTING THE COMMUNICATION OF INFORMATION VIA A COMMUNICATIONS SYSTEM

BACKGROUND OF THE INVENTION

The invention is based on a priority application DE 10 115 031.8 which is hereby incorporated by reference.

The invention concerns a method for supporting the communication of information via a communications system which comprises communications networks of two or more network operators, the method being such that, prior to the communication of the information, a service unit of the communications system is contacted and a request for the communication of the information is thereupon passed to the service unit. The invention further concerns a service unit, an electronic agent, software products and servers for supporting the communication of information via a communications system which comprises communications networks of two or more network operators.

The invention proceeds from a method such as described in, for example, EP 96108544:

A subscriber signals a connection request, specifying a desired connection, to a communications network via a terminal. Upon receipt of this signalling message, a service switching centre of the communications network triggers a service control unit and communicates to the latter the parameters of the desired connection. From this data, the service control unit then determines tariff data relating to the costs of the desired connection. For this purpose, it accesses a databank in which the tariffs of various network operators are stored, and calculates the tariff data from this data. The tariff data is then sent to the terminal before the desired connection is established. The subscriber can thus decide whether, or via which network operator, to establish the connection. Furthermore, it is also possible for the service control unit to select the most favourable network operator for the desired connection and to initiate the establishment of the connection following confirmation by the subscriber.

SUMMARY OF THE INVENTION

The object of the invention is to support the communication of information via a communications system which comprises communications networks of two or more network operators.

This object is achieved by a method for supporting the communication of information via a communications system which comprises communications networks of two or more network operators, the method being such that, prior to the communication of the information, a service unit of the communications system is contacted and a request for the communication of the information is thereupon passed to the service unit, wherein the service unit passes the request for the communication of the information to two or more electronic agents which interact with the service unit within the framework of a virtual electronic marketplace for information communication, the electronic agents being respectively assigned to one of the network operators and making decisions, within the framework of the electronic marketplace for information, by means of a decision logic, according to criteria specified by the respective network operator, the service unit, prompts the electronic agents, once or several times, through interaction within the framework of the electronic marketplace for information, to submit offers for the execution of the requested communication of information, an offer submitted by one of the electronic agents in response to such a prompt, through interaction within the framework of the electronic marketplace for information, is confirmed to this electronic agent by the service unit as having been accepted, the service unit initiates the communication of the information via the communications network of the network operator to whom this electronic agent is assigned, and this electronic agent communicates negotiated conditions for the transmission of the information via the communications network of the network operator to the network management unit of this network operator.

A service unit for supporting the communication of information via a communications system which comprises communications networks of two or more network operators, wherein the service unit is designed so that, when a request for the communication of information is passed to it, it passes the request for the communication of the information to two or more electronic agents which interact with the service unit within the framework of a virtual electronic marketplace for information communication, the electronic agents being respectively assigned to one of the network operators and making decisions, within the framework of the electronic marketplace for information, by means of a decision logic, according to criteria specified by the respective network operator, the service unit is furthermore designed so that, through interaction within the framework of the electronic marketplace, it prompts electronic agents, once or several times, to submit offers for the execution of the requested communication of information, the service unit is furthermore designed so that an offer submitted by one of the electronic agents in response to such a request, through interaction within the framework of the electronic marketplace, is confirmed to this electronic agent by it as having been accepted, and the service unit is furthermore designed so that it initiates the communication of the information via the communications network of the network operator to whom this electronic agent is assigned.

An electronic agent for supporting the communication of information via a communications system which comprises communications networks of two or more network operators, wherein the electronic agent is designed so that it interacts, within the framework of a virtual electronic marketplace for information communication, with a service unit which passes to it requests for the communication of information and, within the framework of the electronic marketplace for information, makes decisions, by means of a decision logic, according to criteria which are specified by a network operator to whom it is assigned, and the electronic agent is furthermore designed so that when it is prompted by the service unit, through interaction within the framework of the electronic marketplace for information, to submit offers for the execution of the requested communication of information, it makes a decision, by means of the decision logic, according to the criteria, to submit or not to submit an offer in response to this prompt, and the electronic agent is furthermore designed so that when, through interaction within the framework of the electronic marketplace for information, an offer submitted by it is confirmed to it by the service unit as having been accepted, it communicates the negotiated conditions for the transmission of the information via the communications network of the network operator to whom it is assigned to a network management unit of this network operator.

Software product for supporting the communication of information via a communications system which comprises communications networks of two or more network operators, wherein the software product is designed so that, in its execution on a server, it performs the function of a service unit and software product for supporting the communication of information via a communications system which comprises communications networks of two or more network operators, wherein the software product is designed so that, in its execution on a server, it performs the function of an electronic agent.

Servers for supporting the communication of information via a communications system which comprises communications networks of two or more network operators, wherein the server comprises control means which are designed so that they perform the functions of a service unit and server for supporting the communication of information via a communications system which comprises communications networks of two or more network operators, wherein the server comprises control means which are designed so that they perform the functions of an electronic agent.

This invention is based on the concept of providing a service, within a communications system, which operates an electronic marketplace for information communication. Network operators can locate their electronic agents on this electronic marketplace. Upon triggering of the service for communication of information, desired by a subscriber, the conditions for this requested information communication are individually negotiated by means of these electronic agents. The service then initiates the corresponding routing in the communications system and the electronic agent which has procured the award transmits the individually negotiated conditions to the network management system of its network operator.

The advantage of the invention consists in that the conditions for a communications connection or the communication of a certain quantity of data no longer result directly from a general tariff body, but are in each case negotiated individually and thus correspond better to the immediate interests of subscribers and network operators. This results, firstly, in a better utilization of the resources of the network operators and in a more even utilization of the communications system and, secondly, in more favourable usage conditions for subscribers.

Advantageous developments of the invention are disclosed by the sub-claims.

BRIEF DESCRIPTION OF THE DRAWINGS

The invention is described in an exemplary manner in the following, using embodiment examples, with reference to accompanying drawings.

Figure 1:
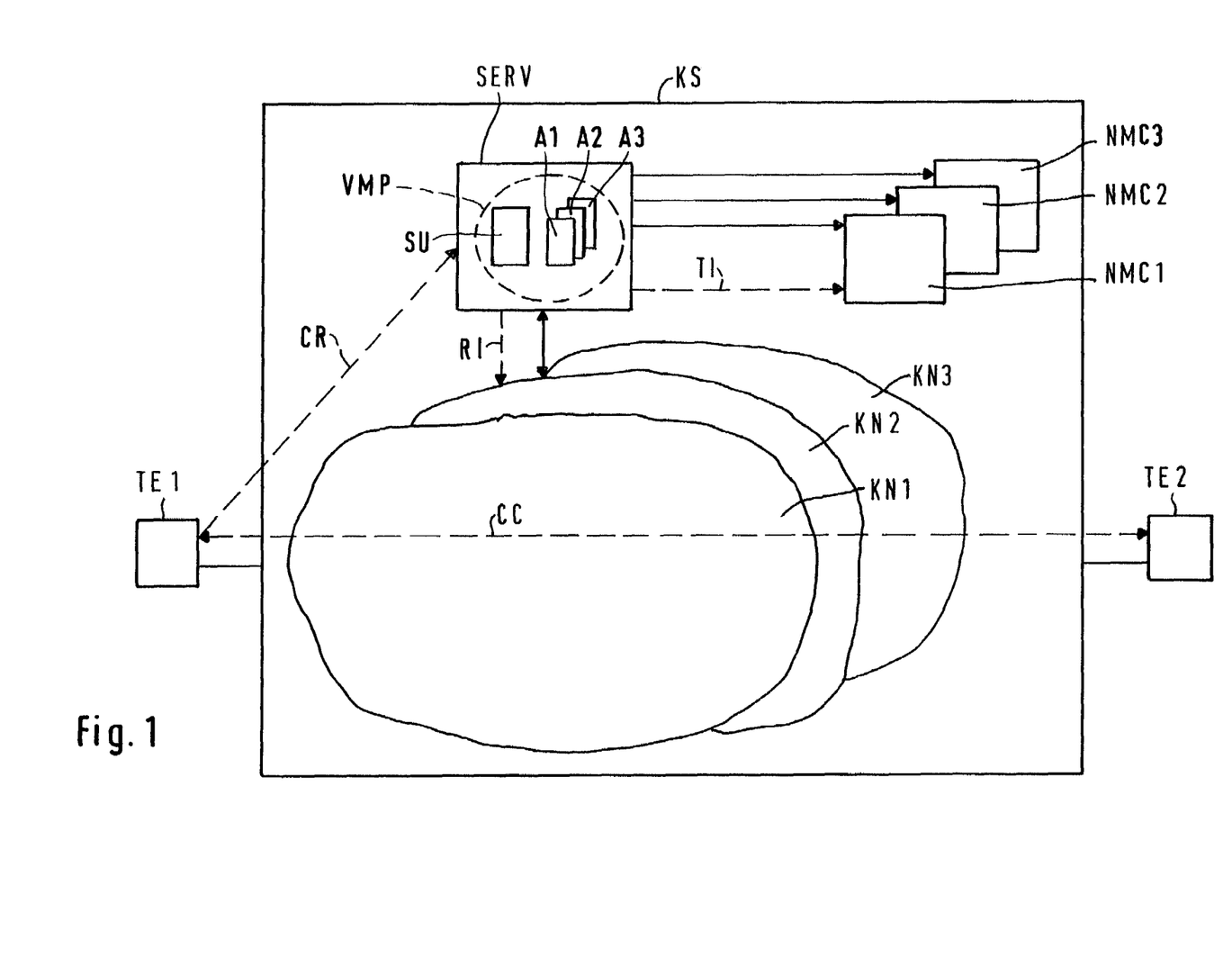
FIG. 1 shows a block diagram of a communications system with a server according to the invention.

FIG. 1 shows a communications system KS and a plurality of terminals TE1 and TE2 connected to the communications system KS.

The terminals TE1 and TE2 are telephone terminals such as a telephone, fax or mobile radiocommunications telephone. Furthermore, it is also possible for the terminals TE1 TE2 to be communications terminals of a different type such as, for example, computers with an interface card for data communication or for mobile data communication, multimedia terminals for speech, data and/or video communication, or a server for sending information, for example, video and speech information, to a multiplicity of receivers.

The communications network KS is designed so that it renders possible communication between the terminals TE1 and TE2. In the simplest case, the communications system KS is a conventional telephone communications system which comprises a plurality of interconnected communications networks which can also be assigned to different network levels.

Of the communications networks of the communications system KS, three exemplary communications networks KN1 to KN3 are shown in FIG. 1. Each of the communications networks KN1 to KN3 is assigned to a different network operator, who operates and manages the respective communications network. The communications networks KN1 to KN3, in turn, can each consist of one or more sub-networks, for example, of one or more optical backbone networks, one or more subscriber networks (for example, cable networks), one or more IP networks (IP=Internet protocol) supported on them, telephone networks or mobile radiocommunications networks. The precise construction of the communications networks KN1 to KN3 is preferably to be adapted to the communications services required by the terminals TE1 to TE3.

The communications system KS furthermore comprises a server SERV and three network management systems NMC1 to NMC3, by means of which the network operators of the communications networks KN1 to KN3 manage and control their respective communications network KN1, KN2 and KN3.

The server SERV provides one or more services in the communications system KS which support the communication of information via the communications system KS. This server SERV is preferably assigned to a service operator who is independent of the network operators of the communications networks KN1 to KN3. However, it is also possible for the server SERV to be assigned to a network operator and to be operated by the latter.

The server SERV consists of one or more computers (hardware platform) connected via a communications network, of a software platform, supported on this hardware platform, consisting of, for example, an operating system, databank system, middleware components and an ORB platform (ORB=object request broker), for example, a CORBA platform (CORBA=common object request broker architecture), and of a plurality of application programs supported on this software platform. Through the execution of the application programs on the software and hardware platforms of the server SERV, the server SERV implements, in particular, the functions of a service unit SU which are described in the following and of two or more electronic agents, of which three exemplary electronic agents A1 to A3 are shown in FIG. 1. The control means of the server SERV, i.e., the hardware platform, software platform and application programs, thus operate together to perform the functions of the service unit SU and the electronic agents A1 to A3.

The terminal TE1 sends to the communications system KS a request message for the communication of information. This request message is formed by, for example, a special signalling message. Upon sending of the request message, the service unit SU is contacted in the communications system KS and a request CR for communication of the information is thereupon passed to the service unit SU.

In this case, it is possible, firstly, for the terminal TE1 to address the request message directly to the service unit SU or to the service provided by the service unit SU and for the request message to be routed, as a request CR, through the communications network KS to the service unit SU. It is also possible for a node of one of the communications networks KN1 to KN3 to recognize the request message as such and thereupon to contact the service unit SU by sending a trigger message. The trigger message or a message, following the trigger message, whose content is the request by the terminal for the communication of information, then constitutes the request CR.

This can be realized by means of, for example, an IN architecture: the terminal TE1 signals to the communications system KS a connection request in which it requests the establishment of a communication connection to a call number, which consists of a prefix for the service provided by the service unit SU and of the call number of the terminal TE2. A service switching centre of one of the communications networks KN1 to KN3 recognizes this connection request as a service request on the basis of the prefix. The service switching centre thereupon sends to the server SERV which, within the framework of the IN architecture, performs the function of an SCP (service control point), an INAP service request message (INAP=intelligent network application protocol) which initiates the performance of the service and passes to the server SERV the call number of the called subscriber and of the calling subscriber as a specification of the requested communication of information. This service request message in this case constitutes the request CR.

Furthermore, it is also possible for a logic within the communications system KS to recognize requests for the communication of information which fulfil certain criteria, and to forward these requests to the service unit SU. Criteria for this are, for example, originating terminal, destination terminal, and addressed communications service.

The electronic agents A1 to A3 interact with the service unit SU within the framework of a virtual electronic marketplace VMP for information communication. The electronic agents A1 to A3 are respectively assigned to one of the network operators of the communications networks KN1, KN2 and KN3, and within the framework of the electronic marketplace VMP for information, make decisions by means of a decision logic, according to criteria specified by the respective network operator.

When a request for the communication of information is passed to it, the service unit SU passes the request for the communication of the information to the electronic agents A1 to A3. Thus, for example, if the request CR is passed to it by means of a service request message, it passes the request CR to the electronic agents A1 to A3 by sending them a message whose content is the request CR. It is obviously possible for this message to contain further, additional, information, or for the request CR to be passed to the electronic agents A1 to A3 through a plurality of messages.

The service unit SU then prompts the electronic agents A1 to A3, once or several times, through interaction within the framework of the electronic marketplace VMP, to submit offers for the execution of the requested communication of information. This prompt can also be submitted to the electronic agents A1 to A3 simultaneously with the message concerning the request CR, for example, in that it also contains the message concerning the request CR.

When the electronic agents A1 to A3 are prompted by the serviced unit SU, through interaction within the framework of the electronic marketplace VMP for information, to submit offers for the execution of the requested communication of information, they each make a decision, by means of their decision logic, according to the criteria specified by the respective network operator, to submit or not to submit an offer in response to this prompt. If such an offer is submitted by one of the electronic agents A1 to A3 in response to such a prompt, through interaction within the framework of the electronic marketplace VMP, the service unit SU confirms to this electronic agent that this offer has been accepted. It is obviously possible in this case for the service unit SU not to accept each offer immediately, but to make a selection between different offers.

The service unit SU then initiates the communication of the information via the communications network of the operator to whom is assigned the electronic agent whose offer it has confirmed. For this purpose, it sends, for example, a corresponding control command to the service switching centres from which it has received the service request message. This service switching centre then initiates the establishment of a corresponding communication connection CC.

The electronic agent to which the service unit SU, through interaction within the framework of the electronic marketplace VMP for information, has confirmed acceptance of an offer submitted by the electronic agent, further communicates the negotiated conditions for the transmission of the information, for example conditions TI, to a network management unit of the network operator to whom it is assigned. The network management unit is part of the respective network management system NMC1 to NMC2. In the simplest case, the conditions TI contain the negotiated tariff for the transmission of the information. In this case, it is advantageous for the network management unit to be the charging system of the respective network operator.

The detailed structure of the server SERV is now explained with reference to FIG. 2.

Figure 2:
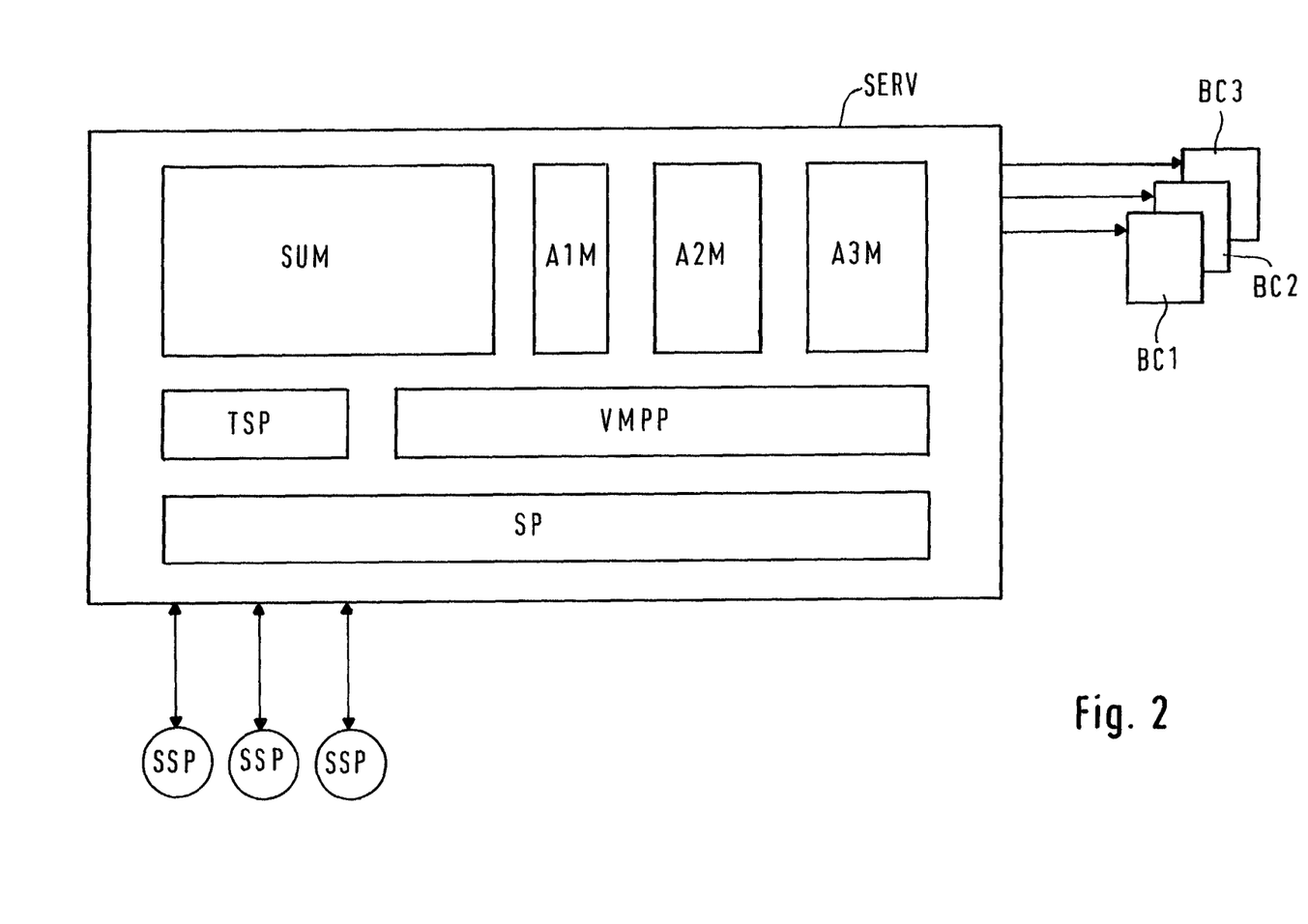
FIG. 2 shows a block diagram of a server according to the invention, as in a first embodiment example.

FIG. 2 shows the server SERV, network management units BC1 to BC3 and a plurality of service switching centres SSP.

The network management units BC1 to BC3 respectively represent a charging server of the communications networks KN1, KN2 and KN3. For the respective network operator, this server controls the charging, or a part of the charging, of the information communication through the respective communications network KN1, KN2 and KN3.

The service switching centres SSP respectively represent switching centres of the communications networks KN1 to KN3, which have a service switching functionality according to the IN architecture.

In addition to the hardware components already described above, the server has a plurality of software modules SP, TSP, VMPP, SUM, A1M, A2M and A3M, which are each formed by one or more computer programs, possibly also with associated data.

The software modules SP, TSP, VMPP, SUM, A1M, A2M and A3M each represent a software product, either singly or in combination with another software module. A software product is formed by one or more computer programs as such, possibly also with associated data.

A software product can also be formed by one or more data media on which one or more computer programs, possibly also with associated data, are stored. Consequently, a data medium on which the programs (and possibly also data) of one of the software modules SP, TSP, VMPP, SUM, A1M, A2M and A3M are stored also represent a computer product in the sense of the invention.

The software module SP comprises the server SERV software, denoted above as a software platform.

The software module VMPP comprises software which enables the service unit SU and the electronic agents A1 to A3 to interact within the framework of the virtual electronic marketplace VMP for information communication. This software makes this electronic marketplace for information communication available to the participants, thus, for example, to the service unit SU and the electronic agents A1 to A3: it manages this electronic marketplace and forms the platform for this interaction. In this connection, it performs functions such as, for example, management, registration, authentication of the participation and management of the communication relationships between the participants. Furthermore, it makes available to the participants a whole bundle of services by means of which the participants transact the interactions. In addition to interaction and communication services, such services also comprise services which assure the security and verifiability of the interactions transacted via them and statements/statement contents communicated through interactions.

It is advantageous in this case for the software module VMPP to provide services which enable electronic agents to register themselves on the electronic marketplace for information communication and to install their software, for example, the software comprised by the software modules A1M, on the server SERV. Only such registered electronic agents then subsequently receive prompts from the service unit SU and can interact via the software module VMPP.

The software module TSP comprises communications software which enables the service unit SU, on the one hand, to be contacted by a network element of one of the communications networks KN1 to KN3 and to receive a request for the communication of information and, on the other hand, to send control commands to network elements of the communications networks KN1 to KN3. Thus, for example, the software module TSP comprises the software for processing the INAP protocol and the protocol layers beneath it, e.g. OSI protocols (OSI=open system interconnection) or TCP/IP protocols (TCP=transaction capability part).

The software module SUM comprises the computer programs which control the functions of the control unit SU. For this purpose, these programs access both services of the software module TSP and services of the software module VMPP. The software module SUM is thus on the one hand adapted to the software interfaces of the software modules TSP and VMMPP and, on the other hand, adapted to the API (=application program interface) provided by the software module SP. In its execution on the hardware platform of the server SERV, the software module SUM executes the following functions:

When a request for the communication of information is passed to the software module SUM via the software module TSP, it passes the request for the communication of information to two or more electronic agents which interact with it, via the software module VMPP, within the framework of a virtual electronic marketplace for information communication provided by the software module VMPP. Furthermore, the software module SUM prompts these electronic agents, once or several times, by means of access to the software module VMPP, through interaction within the framework of the electronic marketplace provided by the software module VMPP, to submit offers for the execution of the requested communication of information. Furthermore, through interaction via the software module VMPP, an offer (OF) submitted by one of the electronic agents in response to such a prompt, via the software module VMPP, through interaction within the framework of the electronic marketplace provided by the software module VMPP, is confirmed to this electronic agent (A1) by the service unit (SU) as having been accepted. The software module, through access to the services of the software module TSP, then initiates the communication of the information via the communications network of the operator to whom this electronic agent is assigned.

The software modules A1M to A3M respectively comprise the computer programs which control the functions of the electronic agents A1, A2 and A3. For this purpose, these programs access services of the software module VMPP. Consequently, the software modules A1M to A3M are on the one hand adapted to the software interfaces of the software module VMMPP and, on the other hand, adapted to the API (=application program interface) provided by the software module SP. In terms of program technology, it is advantageous in this case for the software modules A1M to A3M to be realized by means of the so-called "intelligent agent" or "mobile agent" technology.

In its execution on the hardware platform of the server SERV, the software module A1M executes, for example, the following functions:

The software module A1M interacts, via the software module VMPP, with a service unit which passes to it, within the framework of a virtual electronic marketplace for information communication provided by the software module VMPP, requests for the communication of information. It makes decisions, within the framework of the electronic marketplace for information, by means of a decision logic, according to criteria which have been specified to the software module A1M by a network operator to whom it is assigned. For the software module A1M, this is the network operator of the communications network KN1. When, through interaction within the framework of the electronic marketplace for information provided by the software module VMPP, the software module A1M is prompted by the service unit, via the software module VMPP, to submit offers for the execution of the requested communication of information, it makes a decision, by means of the decision logic, according to the criteria, to submit or not to submit an offer in response to this prompt. When, through interaction within the framework of the electronic marketplace for information provided by the software module VMPP, the service unit confirms to it that an offer submitted by it through interaction via the software module VMPP has been accepted, it then communicates to the network management unit BC1 the negotiated conditions for the transmission of the information.

In the embodiment example described with reference to FIG. 2, the software modules A1M to A3M are executed on the same computer platform as the software module SUM and thus run together on the server SERV.

Figure 3:
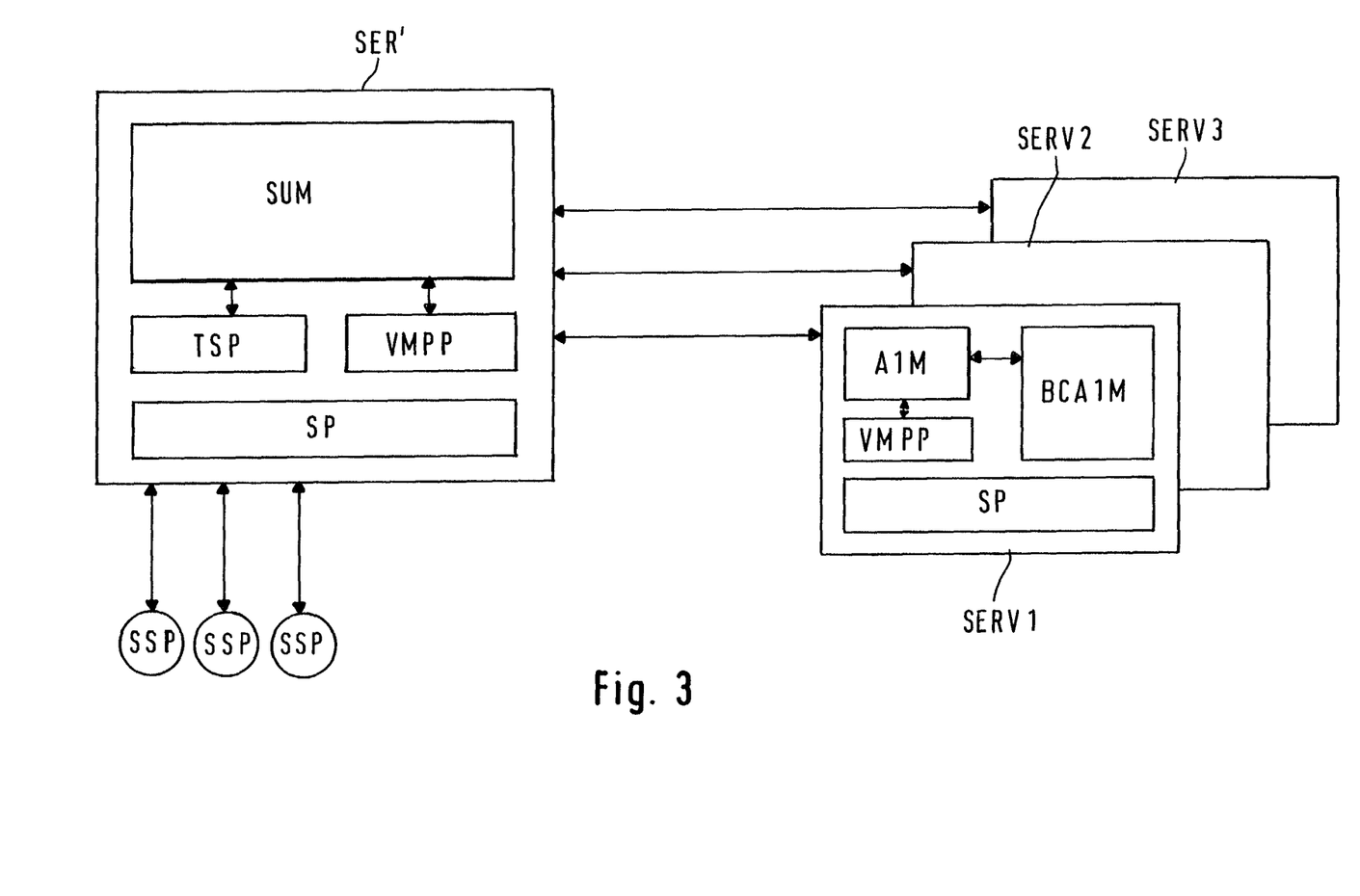
FIG. 3 shows a block diagram of a plurality of servers according to the invention, as in a second embodiment example.

An alternative to this, in which the software modules A1M to A3M are executed on a computer platform assigned to its respective network operator, is shown in FIG. 3.

FIG. 3 shows four servers SERV' and SERV1 to SERV3 and the service switching centres SSP. The server SERV' comprises the software modules SP, VMPP, TSP and SUM, which are designed like the corresponding software modules according to FIG. 2. The structure of the servers SERV1 to SERV3 is shown using the exemplary structure of the server SERV1. The server SERV1 comprises the software modules A1M, VMPP, SP, which are constructed like the corresponding software modules according to FIG. 2, and a software module BCA1.

The software module BCA1M is a charging application which controls the charging within the communications network KN1. In this embodiment example, this application represents the network management unit to which negotiated conditions are communicated.

In this case, in contrast to the embodiment example according to FIG. 2, the platform formed by the software module VMPP is distributed via the servers SERV', SERV1 to SERV3. The parts of the software module VMPP which are distributed via different servers communicate with one another via a communications network, for example, an IP network. Furthermore, the software module A1M can interact directly with the software module BCA1M executed on the server SERV1 and is located within the scope of influence of the network operator of the communications network KN1.

Figure 4:
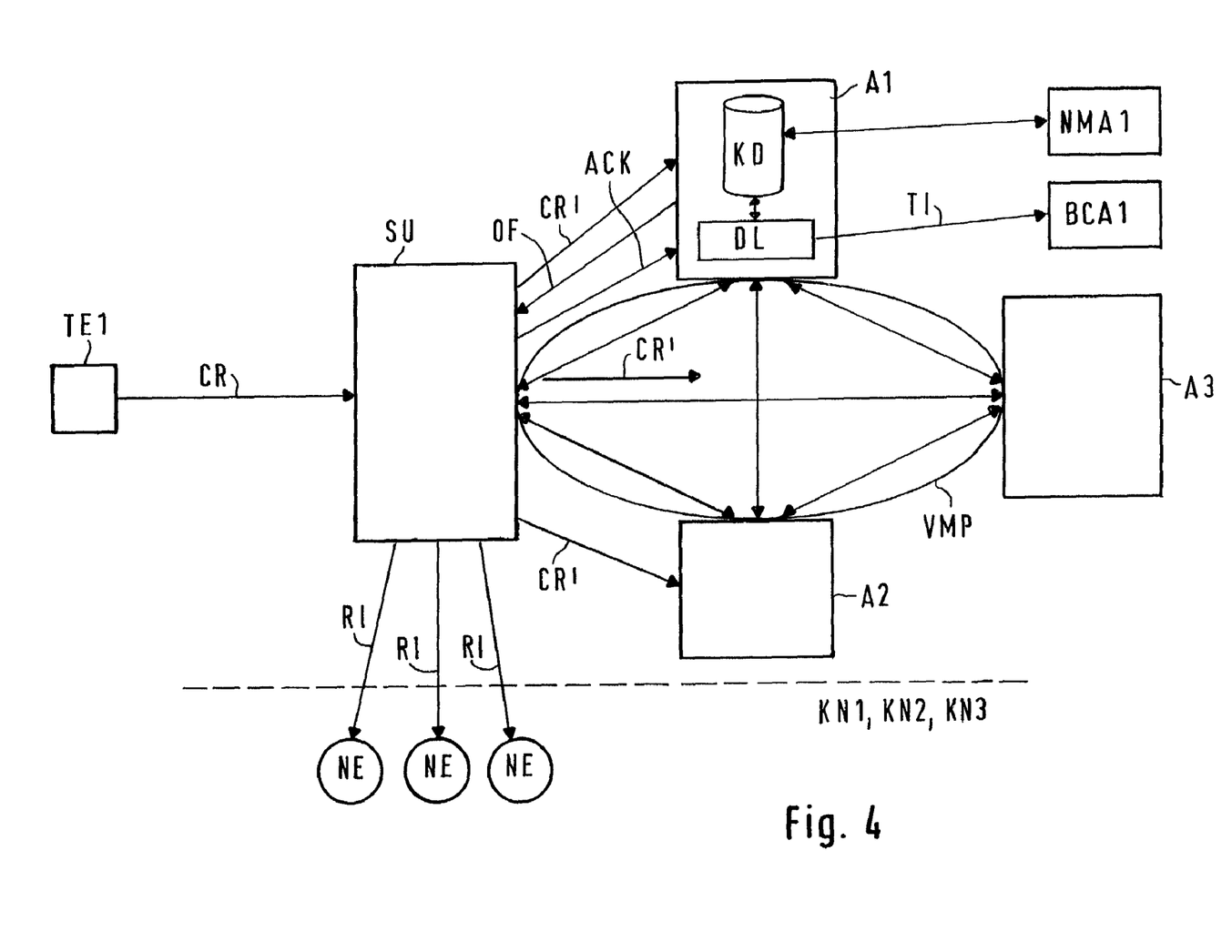
FIG. 4 shows a functional representation with a service unit according to the invention and a plurality of electronic agents according to the invention.

The detailed functioning of the service unit SU, the electronic agents A1 to A3 and the software modules SUM and A1M to A3M are now explained with reference to FIG. 3:

FIG. 4 shows the terminal TE1, the service unit SU, the electronic agents A1 to A3, a plurality of network elements NE of the communications networks KN1 to KN3, and two network management units NMA1 and BCA1 of the communications network KN1.

As already described in connection with the embodiment example according to FIG. 1, the service unit SU receives a request CR for the communication of information.

This request CR can be directed, on the one hand, to the establishment of a communication connection, between a calling terminal and one or more called terminals, for the transmission of the information via this communication connection. In order to specify this request, the request contains, for example, the communication addresses of the calling and called terminals. Furthermore, it is possible for further conditions for this requested communication connection to be already contained in the request. These can relate to the nature of the communication connection and the requested communications service, for example, they can specify a packet-oriented, asynchronous connection such as an ATM connection, or a synchronous connection such as a conventional telephone connection. They can relate to the bandwidth of the connection. They can relate to the duration or to the quantity of data to be transmitted.

Furthermore, it is also possible for the request CR to request connectionless communication of information from a first terminal to one or more second terminals, and thus to specify a conventional data transmission. In this case, likewise, the conditions described above can be part of the request.

The service unit SU interacts with the electronic agents A1 to A3 within the framework of the virtual electronic marketplace VMP for information communication which, as set forth above, is provided by the software module VMPP.

The service unit SU passes the request communicated to it to the electronic agents A1 to A3 and, through interaction within the framework of the electronic marketplace VMP, prompts them, once or several times, to submit offers for the execution of the requested communication of information.

Thus, for example, upon receipt of the request CR, the service unit SU interacts by sending a request CR' to each of the electronic agents A1 to A3. It is advantageous in this case for the request CR' to contain the message concerning the receipt of the request CR.

Furthermore, together with the prompt to submit offers for the execution of the requested communication of information, it is advantageous for the service unit SU to specify to the electronic agents A1 to A3 one or more conditions for this communication. For this purpose, the prompt CR' can contain, for example, the conditions for the information transmission, contained in the request CR, and further conditions.

The conditions specified to the electronic agents A1 to A3 can specify the nature and manner of the communication of the information: in addition to the conditions already stated above, such conditions can be, for example, the data rate, transmission time, nature of the data: "stream"-oriented, e.g. for video on demand, "peak"-oriented, maximum required throughput, priority of the data.

The conditions specified to the electronic agents A1 to A3 can also specify the charging of the communication of the information, for example, nature of the charging, charging conditions, tariff rate amount or total amount of tariffs.

The electronic agent A1 comprises a decision logic DL and a data record with criteria KD. The criteria KD are specified by the network operator to whom it is assigned. For example, the criteria KD can be modified and updated by the network management unit NMA1. The electronic agent A1 makes decisions, within the framework of the electronic marketplace VMP for information, by means of this decision logic DL and these criteria KD. The decision logic DL represents, for example, an expert system such as that used in the domain of "intelligent agents". The criteria KD form the basis for the decisions of the decision logic DL. For example, the criteria determine the strategy of the decision logic in respect of the other electronic agents, a margin for acceptable conditions, network loading, free resources of the communications network KN1, and valuation and rating of conditions.

When the service unit SU submits several successive prompts to the electronic agents, it is advantageous for it to successively alter one or more of the respectively associated conditions, until one of the electronic agents A1 to A3 submits an offer. Thus, in the simplest case, it successively increases the tariff that the network operator is to receive for the communication of the information and awards the communication of the information to the first network operator to submit a corresponding offer.

When, through interaction within the framework of the electronic marketplace VMP for information, the electronic agent A1 is prompted by the service unit SU, through the prompt CR', to submit an offer for the execution of the requested communication of information, it makes the decision, by means of the decision logic DL, according to the criteria KD, to submit or not to submit an offer in response to the prompt CR'.

In this case, it is possible, on the one hand, for the electronic agent A1 to submit an offer, in response to the prompt CR', under the conditions specified in the prompt CR'. It is also possible, however, for the decision logic DL, for its part, to determine conditions and to base the offer on these conditions of its own. Thus, in addition to offer yes or no decision, the decision logic DL can also determine conditions for an offer. This is particularly advantageous if the conditions contained in the prompt CR' are not final.

If the decision logic DL determines to submit an offer, the electronic agent, through interaction within the framework of the electronic marketplace VMP for information, submits an offer OF to the service unit SU. This offer OF may not contain any conditions, and may relate only to the prompt CR'. However, the offer OF may also specify to the service unit SU one or more conditions for this communication. These conditions may be conditions associated with the prompt CR' but, as set forth above, they may also be conditions determined by the decision logic itself.

The service unit SU evaluates the one or more offers of the electronic agents A1 to A3 submitted in response to the prompt CR'. It checks whether each of the offers is acceptable and, in the case of several offers remaining, selects the offer which best corresponds to predefined criteria. In this case, these criteria can also be dependent on the profile of the service user, or be individually predefined by the service user.

Through interaction within the framework of the electronic marketplace VMP, the service unit SU confirms, to the electronic agent which submitted it, that the offer selected in this manner has been accepted.

In the simplest case, the service unit SU confirms, without examination, the offer first received by it following submission of the prompt CR'.

If no offer is submitted to the service unit SU by an electronic agent A1 to A3 in response to the prompt CR' within a certain period of time, the service unit SU prompts the electronic agents, through a new prompt, preferably with a changed content, to again submit offers.

This procedure is repeated several times, or for a certain period of time, after which the execution of the service is aborted.

In the embodiment example according to FIG. 4, the electronic agent A1, through interaction within the framework of the electronic marketplace VMP, submits an offer OF in response to the prompt CR'. Through interaction within the framework of the electronic marketplace VMP, the service unit SU confirms to the electronic agent A1, with an acknowledgement ACK, that the offer OF has been accepted. The service unit SU then initiates the communication of the information via the communications network KN1, i.e., via the communications network of the network operator to whom the electronic agent A1 is assigned. For this purpose, it sends corresponding routing information RI to network elements NE which control a corresponding routing of the information through the communications system KS. Depending on the nature of the communications networks KN1 to KN3, these network elements NE are, for example, switching centres, cross-connects, routers and bridges. It is also possible for the service unit to pass the routing information RI to the terminal TE1 and, in this manner, to initiate the communication of the information via the communications network of this network operator.

Upon receipt of the acknowledgement ACK, the electronic agent A1 communicates to the network management unit BCA1 negotiated conditions TI for the transmission of the information via the communications network. These conditions can be the conditions which are associated with the offer OF. However, it is also possible for the conditions TI to represent only some of these conditions, for example, only the tariff-related conditions.

It is furthermore possible for offers submitted by electronic agents in response to the prompt CR', through interaction within the framework of the electronic marketplace, to relate only to a partial communication of the information and for the service unit SU to confirm several such offers, so that a complete communication of the information results. The transmission of the information is consequently effected via the communications networks of different network operators.

The invention claimed is:

1. A method for supporting the communication of information via a communications system which comprises communications networks of two or more network operators, the method comprising:

prior to the communication of the information, a service unit of the communications system is contacted and a request for the conmimunication of the information is thereupon passed to the service unit, wherein the service unit passes the request for the communication of the information to two or more electronic agents which interact with the service unit within the framework of a virtual electronic marketplace for information communication, and the electronic agents being respectively assigned to one of the network operators and making decisions, within the framework of the electronic marketplace for information, by means of a decision logic, according to criteria specified by the respective network operator, the service unit prompts the electronic agents, once or several times, through interaction within the framework of the electronic marketplace for information, to submit offers for the execution of the requested communication of information, an offer submitted by one of the electronic agents in response to the prompt, through interaction within the framework of the electronic marketplace for information, is confirmed to the electronic agent by the service unit as having been accepted, the service unit initiates the communication of the information via the communications network of the network operator to whom the electronic agent is assigned, and the electronic agent communicates negotiated conditions for the transmission of the information via the communications network of the network operator to the network management unit of the network operator.

2. The method according to claim 1, wherein the request for the communication of the information requests the establishment of a communication connection between a calling terminal and one or more called terminals for the communication of the information via the communication connection.

3. The method according to claim 1, wherein the request for the communication of the information requests connectionless communication of information from a first terminal to one or more second terminals.

4. The method according to claim 1, wherein, with a prompt to submit offers for the execution of the requested communication of information, the service unit specifies to the two or more electronic agents one or more conditions for this communication.

5. The method according to claim 4, wherein the service unit successively alters one or more of the conditions, respectively associated with prompts, until one of the electronic agents submits an offer.

6. The method according to claim 1, wherein the offer submitted by one of the electronic agents in response to the prompt, through interaction within the framework of the electronic marketplace, specifies to the service unit one or more conditions for the communication.

7. The method according to claim 4, wherein one or more conditions specify the nature and manner of the communication of the information.

8. The method according to claim 4, wherein one or more conditions specify the charging of the communication of the information.

9. The method according to claim 1, wherein offers submitted by electronic agents in response to the prompt, through interaction within the framework of the electronic marketplace, relate only to a partial communication of the information and the service unit confirms several offers, so that a complete communication of the information results.

10. The method according to claim 1, wherein criteria specified by the respective network operator relate to the strategy of the network operator in respect of other network operators.

11. The method according to claim 1, wherein criteria specified by the respective network operator relate to the network loading of the network operator.

12. The method according to claim 1, wherein electronic agents register themselves on the electronic marketplace for information communication and only registered electronic agents receive prompts from the service unit.

13. A computer readable storage medium storing a control program to have a computer carry out a method for supporting the communication of information via a communications system which comprises communications networks of two or more network operators, the method comprising:
- when a request for the communication of information is passed to a service unit, the service unit passes the request for the communication of the information to two or more electronic agents which interact with the service unit within the framework of a virtual electronic marketplace for information communication,
  - wherein, the electronic agents being respectively assigned to one of the network operators and making decisions, within the framework of the electronic marketplace for information, by means of a decision logic, according to criteria specified by the respective network operator,
- the service unit prompting electronic agents, through interaction within the framework of the electronic marketplace, once or several times, to submit offers for the execution of the requested communication of information,
- the service unit confirming an offer, submitted by one of the electronic agents, as having been accepted, through interaction within the framework of the electronic marketplace, and
- the service unit initiating the communication of the information via the communications network of the network operator to whom the electronic agent is assigned.

14. A computer readable storage medium encoded with program code for supporting the communication of information via a communications system which comprises communications networks of two or more network operators, wherein the computer readable storage medium is designed so that, in execution on a server, the computer readable storage medium performs the method according to claim 13.

15. A server for supporting the communication of information via a communications system which comprises communications networks of two or more network operators, wherein the server comprises a computer readable storage medium storing a control program to have a computer perform the method according to claim 13.

16. A computer readable storage medium storing a control program to have a computer carry out a method for supporting the communication of information via a communications system which comprises communications networks of two or more network operators, the method comprising:
- an electronic agent interacting, within the framework of a virtual electronic marketplace for information communication, with a service unit which passes requests to the electronic agent for the communication of information,
- making decisions, within the framework of the electronic marketplace for information, by means of a decision logic according to criteria which are specified by a network operator to whom the electronic agent is assigned,
- when prompted by the service unit, through interaction within the framework of the electronic marketplace for information, to submit offers for the execution of the requested communication of information, the electronic agent makes a decision, by means of the decision logic according to the criteria, to submit or not to submit an offer in response to the prompt, and
- the electronic agent communicates negotiated conditions for the transmission of the information via the communications network of the network operator to whom the electronic agent is assigned, to a network management unit of the network operator, when an offer submitted by the electronic agent is confirmed by the service unit as having been accepted.

17. A computer readable storage medium encoded with program code for supporting the communication of information via a communications system which comprises communications networks of two or more network operators, wherein the computer readable storage medium is designed so that, in execution on a server, the computer readable storage medium performs the method according to claim 16.

18. A server for supporting the communication of information via a communications system which comprises communications networks of two or more network operators, wherein the server comprises a computer readable storage medium storing a control program to have a computer perform the method according to claim 16.

* * * * *